United States Patent
Amini et al.

(10) Patent No.: US 10,539,036 B2
(45) Date of Patent: Jan. 21, 2020

(54) ABRADABLE SEAL HAVING NANOLAYER MATERIAL

(71) Applicant: United Technologies Corporation, Hartford, CT (US)

(72) Inventors: Shahram Amini, Glastonbury, CT (US); Christopher W. Strock, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 785 days.

(21) Appl. No.: 14/592,196

(22) Filed: Jan. 8, 2015

(65) Prior Publication Data

US 2015/0198056 A1    Jul. 16, 2015

Related U.S. Application Data

(60) Provisional application No. 61/926,989, filed on Jan. 14, 2014.

(51) Int. Cl.
  *F01D 11/12*    (2006.01)
  *C08K 3/04*     (2006.01)

(52) U.S. Cl.
  CPC .............. *F01D 11/122* (2013.01); *C08K 3/04* (2013.01); *F05D 2300/224* (2013.01); *F05D 2300/226* (2013.01); *F05D 2300/437* (2013.01); *F05D 2300/5024* (2013.01)

(58) Field of Classification Search
  CPC .......... F05D 2230/90; F05D 2300/224; F05D 2300/437; F01D 11/122
  See application file for complete search history.

(56) References Cited

U.S. PATENT DOCUMENTS

| | | | |
|---|---|---|---|
| 3,519,282 A | 7/1970 | Davis | |
| 3,547,455 A | 12/1970 | Daunt | |
| 3,575,427 A | 4/1971 | Lapac et al. | |
| 4,349,313 A | 9/1982 | Munroe et al. | |
| 4,423,097 A | 12/1983 | Mons et al. | |
| 6,334,617 B1 | 1/2002 | Putnam et al. | |
| 6,688,867 B2 | 2/2004 | Suman et al. | |
| 7,658,870 B2* | 2/2010 | Nejhad ............... A61K 8/02 106/3 |
| 8,020,875 B2* | 9/2011 | Putnam ............... F01D 11/122 277/415 |
| 9,376,924 B2* | 6/2016 | Murdock .............. F01D 5/147 |
| 2003/0224877 A1 | 12/2003 | Sullivan et al. | |
| 2007/0142548 A1 | 6/2007 | Nejhad et al. | |

(Continued)

FOREIGN PATENT DOCUMENTS

| EP | 2169026 | 3/2010 |
| WO | 2013011028 | 1/2013 |

OTHER PUBLICATIONS

European Search Report for European Application No. 15151093 dated May 6, 2015.

*Primary Examiner* — Woody A Lee, Jr.
*Assistant Examiner* — Sabbir Hasan
(74) *Attorney, Agent, or Firm* — Carlson, Gaskey & Olds, P.C.

(57) ABSTRACT

A gas turbine engine includes a plurality of circumferentially-spaced blades. The blades have a polymeric coating thereon. An abradable seal circumscribes the blades and includes a polymeric matrix with a dispersion of a nanolayer material.

6 Claims, 3 Drawing Sheets

(56) References Cited

U.S. PATENT DOCUMENTS

| | | |
|---|---|---|
| 2007/0197719 A1 | 8/2007 | Putnam et al. |
| 2011/0223404 A1 | 9/2011 | Wu et al. |
| 2013/0156588 A1* | 6/2013 | Murdock ................ F01D 5/147 |
| | | 416/220 R |
| 2014/0162130 A1* | 6/2014 | Barsoum ................ C01B 21/06 |
| | | 429/231.8 |

* cited by examiner

ABRADABLE SEAL HAVING NANOLAYER MATERIAL

CROSS-REFERENCE TO RELATED APPLICATION

This application claims priority to U.S. Provisional Application No. 61/926,989, filed Jan. 14, 2014.

BACKGROUND

This disclosure relates to abradable seals for gas turbine engines.

Abradable seals or coatings (rub coatings) can be used to protect moving parts from damage during rub interaction while providing a small clearance. Such seals are used in turbomachines to interface with the tips of a rotating blade stage, tips of cantilevered vanes and knife edge seals.

SUMMARY

A gas turbine engine according to an example of the present disclosure includes a plurality of circumferentially-spaced blades including a polymeric coating thereon and an abradable seal circumscribing the blades. The abradable seal includes a polymeric matrix with a dispersion of a nanolayer material.

In a further embodiment of any of the foregoing embodiments, the nanolayer material is sheet-structured graphene.

In a further embodiment of any of the foregoing embodiments, the nanolayer material includes MXene.

In a further embodiment of any of the foregoing embodiments, the polymeric matrix is silicone.

In a further embodiment of any of the foregoing embodiments, the polymeric coating is selected from the group consisting of polyurethane-based coating, epoxy-based coating, and silicone-based coating.

In a further embodiment of any of the foregoing embodiments, the abradable seal includes, by weight, 0.1-20% of the nanolayer material.

In a further embodiment of any of the foregoing embodiments, the nanolayer material has a thermal conductivity greater than 5000 watts per meter kelvin (W/m·K).

In a further embodiment of any of the foregoing embodiments, the nanolayer material has an atomic monolayer structure.

In a further embodiment of any of the foregoing embodiments, the nanolayer material has a stacked multi-atomic-layered structure.

A case for a gas turbine engine according to an example of the present disclosure includes an annular support and an abradable seal mounted on a radially inner side of the annular support. The abradable seal includes a polymeric matrix with a dispersion of a nanolayer material.

In a further embodiment of any of the foregoing embodiments, the nanolayer material is sheet-structured graphene and the polymeric matrix is silicone.

In a further embodiment of any of the foregoing embodiments, the nanolayer material includes MXene.

In a further embodiment of any of the foregoing embodiments, the nanolayer material has an atomic monolayer structure.

In a further embodiment of any of the foregoing embodiments, the nanolayer material has a stacked multi-atomic-layered structure.

In a further embodiment of any of the foregoing embodiments, the abradable seal includes, by weight, 0.1-20% of the nanolayer material.

A seal for a gas turbine engine according to an example of the present disclosure includes an annular abradable seal including a polymeric matrix with a dispersion of a nanolayer material.

In a further embodiment of any of the foregoing embodiments, the nanolayer material includes at least one of sheet-structured graphene and MXene, and the polymeric matrix is silicone.

In a further embodiment of any of the foregoing embodiments, the nanolayer material has an atomic monolayer structure.

In a further embodiment of any of the foregoing embodiments, the nanolayer material has a stacked multi-atomic-layered structure.

In a further embodiment of any of the foregoing embodiments, the annular abradable seal includes, by weight, 0.1-20% of the nanolayer material.

A composition according to an example of the present disclosure includes a polymeric matrix a dispersion of a nanolayer material within the polymeric matrix.

In a further embodiment of any of the foregoing embodiments, the nanolayer material includes at least one of sheet-structured graphene and MXene, and the polymeric matrix is silicone.

In a further embodiment of any of the foregoing embodiments, the nanolayer material has an atomic monolayer structure.

In a further embodiment of any of the foregoing embodiments, the nanolayer material has a stacked multi-atomic-layered structure.

A further embodiment of any of the foregoing embodiments includes, by weight, 0.1-20% of the nanolayer material.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
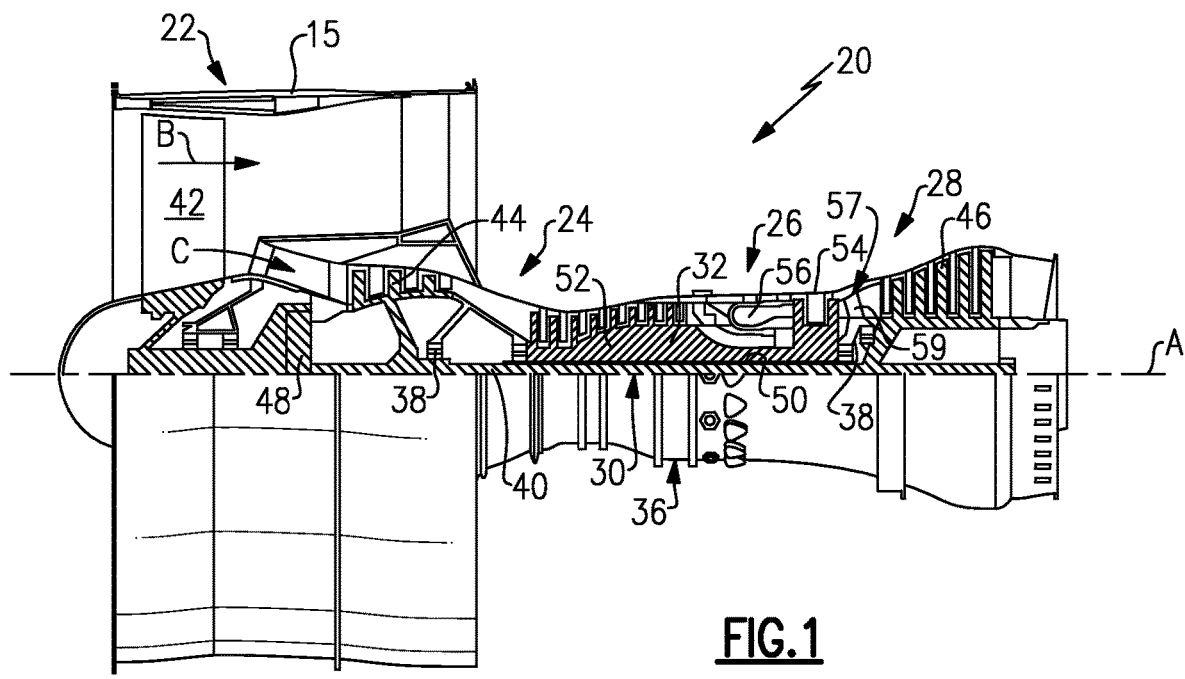
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, and into a core flow path C to the compressor section 24 for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption" (TSFC)—is the industry standard parameter of lbm of fuel being burned divided by lbf of thrust the engine produces at that operating point. "low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second.

Figure 2:
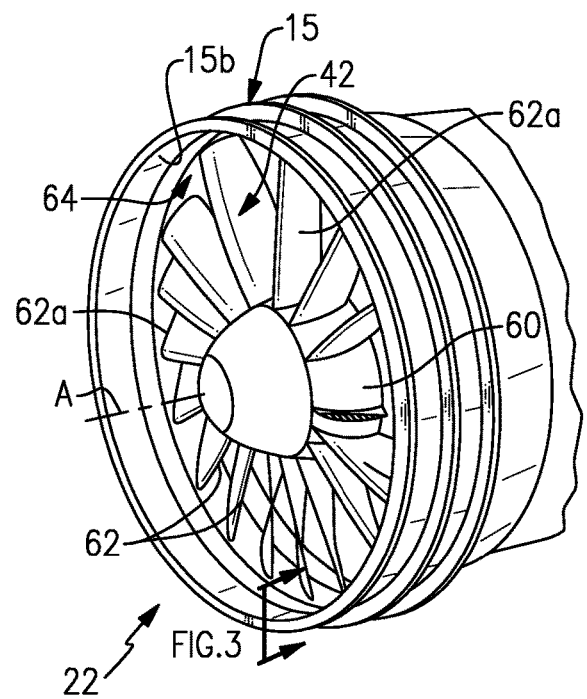
FIG. 2 illustrates an isolated view of the fan section of the gas turbine engine of FIG. 1.

FIG. 2 illustrates an isolated view of the fan section 22 of the engine 20. The fan 42 includes a rotor 60 that has a plurality of circumferentially spaced blades 62. Each of the blades 62 has a polymeric coating 62a on the surfaces thereof, which is also depicted in the cutaway view of FIG. 3.

For example, the polymeric coating 62a serves to protect the underlying body or substrate 65 of the blades 62 from erosion due to foreign particulate ingested into the engine 20. The substrate 65 can be an aluminum alloy, but could alternatively be titanium alloy, reinforced polymer matrix composite material, or other lightweight material. The polymeric coating 62a can be a polyurethane-based coating, an epoxy-based coating, or a silicone rubber-based coating, but is not limited to these types of polymeric coatings or materials. The polymeric coating 62a can cover the pressure and suction sides of the blades 62 and can span the entire lateral surface of the blade 62 between the leading edge and trailing edge. The polymeric coating 62a, however, is not on the blade tip 62b.

Figure 3:
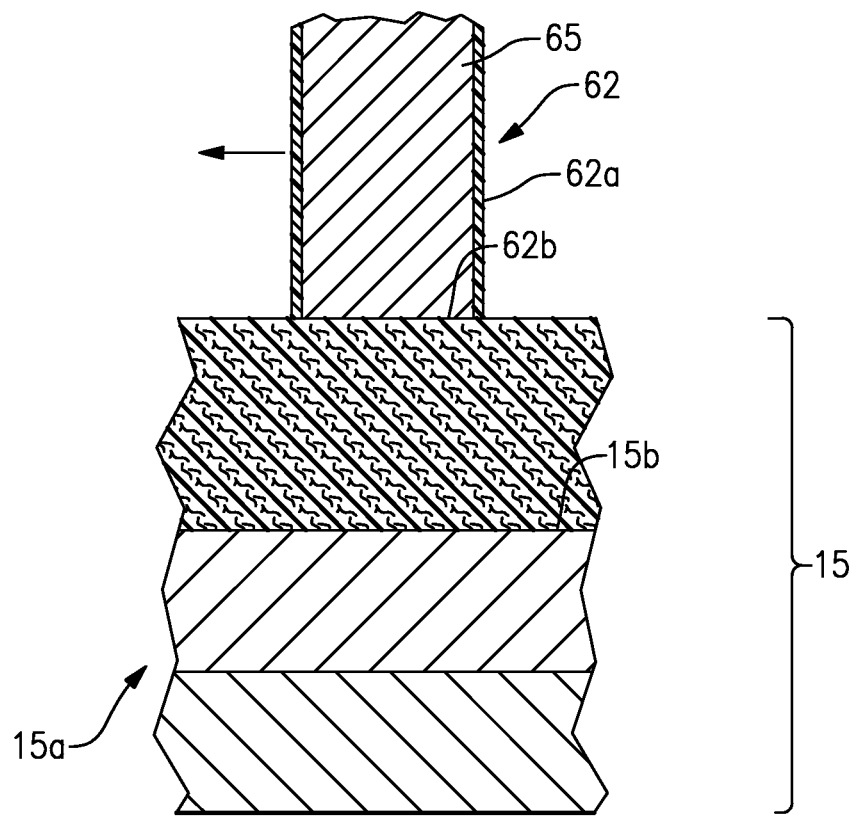
FIG. 3 illustrates a blade tip interfacing with an abradable seal.

The fan case 15 is annular in shape and circumscribes the blades 62. As shown in FIG. 3, the fan case 15 can have a multi-layer structure, including support member 15a. The support member 15a can be a metallic body, but is not limited to metals or alloys. The fan section 22 is designed such that the tips 62b of the blades 62 rub against the fan case 15 during rotation. In this regard, the fan case 15 includes an abradable seal 64 mounted on a radially inner side 15b. The abradable seal 64 can be mounted on the support member 15a by mechanical fastening, mechanical interlocking, adhesive, or combinations thereof, but is not limited to these mounting techniques. The support member 15a can additionally include attachment features, such as hooks, studs, clips, sockets or the like, for securing the support member to a mating component, such as an outer case structure (not shown). Moreover, the abradable seal 64 can have a through-thickness of 1-10 millimeters, and more particularly, 3-6 millimeters.

Figure 4:
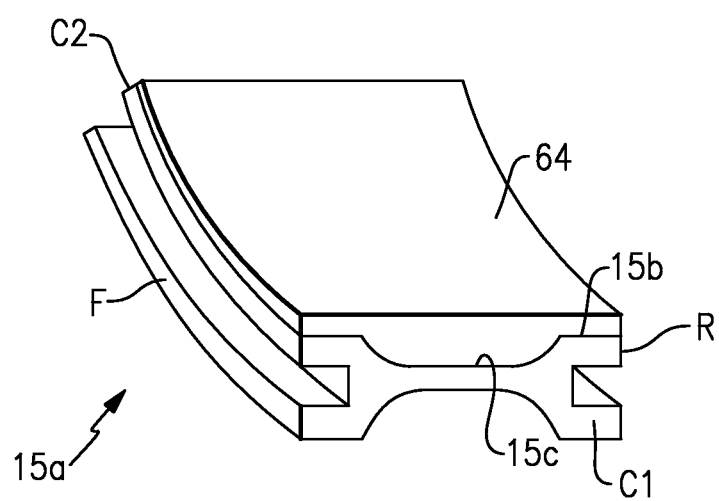
FIG. 4 illustrates a portion of an abradable seal.

FIG. 4 illustrates an example of a portion or segment of the support member 15a. The segment has forward and rear edges, represented at F and R, and first and second circumferential edges C1 and C2. A plurality of such segments can be circumferentially arranged around the blades 62. The support members 15a can be circumferentially-spaced from each other, for purposes of assembly, thermal expansion tolerance, or the like. The abradable seal 64 portion on each segment can abut the abradable seals 64 on respective circumferentially neighboring segments. In this example, the support member 15a includes a recess 15c that provides mechanical interlocking with the abradable seal 64.

When two components are in rubbing, frictional contact, at least one of the components may wear. The term "abradable" refers to the one of the two components that wears, while the other component does not wear or wears less. Thus, when the tips 62b of the blades 62 rub against the seal 64, the seal 64 will be worn whereas the tips 62b of the blades 62 will not wear or will wear less than the seal 64. The word "abradable" thus also implies that there is or can be contact between two components.

The abradable seal 64 is annular in shape and circumscribes the blades 62. For example, the annular seal 64 can be a continuous body that circumscribes the blades 62 or it can be provided in segments that collectively circumscribe the blades 62, as discussed above. In this regard, an annular abradable seal 64 can refer to a full ring or one or more individual segments thereof.

Figure 5:
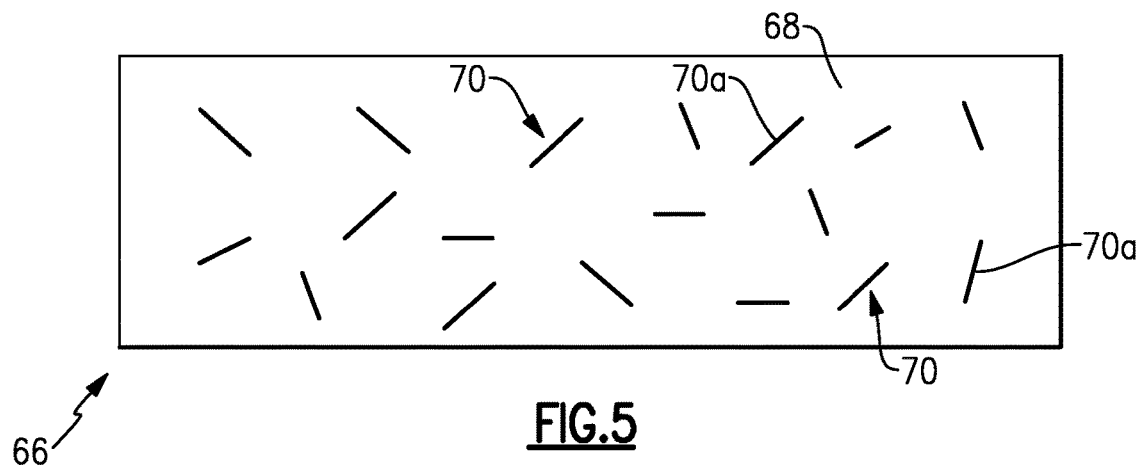
FIG. 5 illustrates an example microstructure of an abradable seal.

FIG. 5 shows a representative portion of the microstructure 66 of the abradable seal 64. The microstructure 66 includes a polymeric matrix 68 with a dispersion of nanolayer material 70.

The polymeric matrix 68 can be a silicone-based material, but is not limited to silicone polymer. Dimethyl- and fluorosilicone are example silicone rubber materials that can be used. The polymeric matrix 68 can also include additives and/or other fillers, such as glass or polymer micro-balloons, to enhance mechanical and/or chemical properties. In further examples, the polymeric matrix 68 includes acrylonitrile micro-balloons in an amount of 10-50% by volume of the abrasive seal 64.

Relative to the polymeric matrix 68, the nanolayer material 70 has higher thermal conductivity. In one example, the nanolayer material 70 has a thermal conductivity greater than 5000 watts per meter kelvin. The use of the nanolayer material 70 thus increases the thermal conductivity of the abradable seal 64 above the conductivity of the polymeric matric alone.

During engine operation when the tips of blades rub against a case, the friction generates heat. For blades that have polymeric coatings, such as fan blades, the heat can conduct into the blade and cause the polymer coating to blister and spall. The nanolayer material 70 of the abradable seal 64 has high thermal conductivity and serves to remove heat generated in the friction areas such that less heat conducts into the blades 62.

In one further example, the nanolayer material 70 is sheet-structured graphene. Sheet-structured graphene is a bonded network of carbon atoms in a 2-dimensional geometry. For example, the sheet-structured graphene can have an atomic monolayer structure, represented at 70a. The atomic monolayer structure 70a is a one-atom thick sheet of bonded carbon atoms, and the sheets may be randomly oriented in the polymeric matrix 68.

In another example, the nanolayer material 70 can be or can include a variation of a MAX phase material. A MAX phase material 24 has a formula $M_{n+1}AX_n$, where n=1–3, M is an early transition metal, A is an A-group element of the Periodic Table, and X includes at least one of carbon and nitrogen. The M in the formula can be selected from Sc, Ti, Zr, Hf, V, Nb, Ta, Cr, Mo, and combinations thereof, and the A in the formula can be selected from Cd, Al, Gd, In, Tl, Si, Ge, Sn, Pb, P, As, S, and combinations thereof. In one example, the nanolayer material 70 is the MAX phase variation "MXene," which compositionally is the MAX phase material with the "A" element excluded and structurally has a sheet structure similar to graphene and having a formula $M_{n+1}X_n$. The M and X constituents each forming single atom thick layers in a sheet like form. MXenes are a large family of 2D materials produced by the extraction of the A-element from the layered ternary carbides, such as Ti3AlC2 and other MAX phases. MXenes are good electrical conductors and have high elastic moduli.

Figure 6:
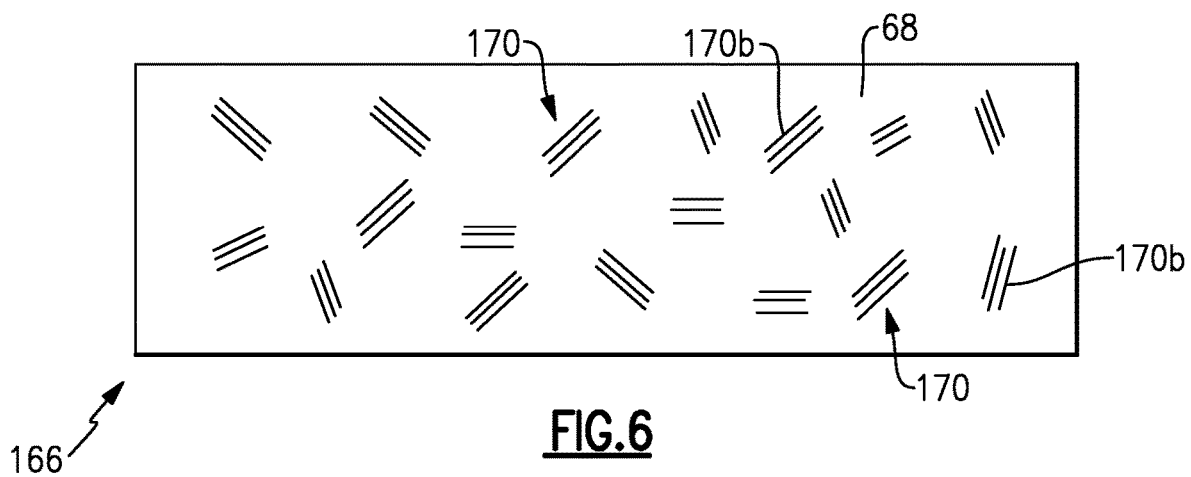
FIG. 6 illustrates another example microstructure of an abradable seal.

FIG. 6 illustrates another example microstructure 166 that is somewhat similar to the microstructure 66 but includes nanolayer material 170. The nanolayer material 170 in this example is also sheet-structured graphene but has a stacked multi-atomic-layered structure, represented at 170b. The stacked multi-atomic-layered structure 170b includes a plurality of oriented layers. For example, each of the layers can be a one-atom thick layer of bonded carbon atoms, and there may or may not be links joining or bonding the layers together. The nanolayer material 170 can also be used in combination with the nanolayer material 70.

In a further example of any of the foregoing examples, the microstructure 66 or 166 can include, by weight, 0.1-20% of the nanolayer material (70, 170, or both). A relatively lower amount provides a relatively lower thermal conductivity of the abradable seal 64 and a relatively higher amount provides a relatively higher thermal conductivity of the abradable seal 64. The nanolayer material 70/170 can also mechanically reinforce the abradable seal 64 such that it is stronger and stiffer than the polymeric matrix 68 would be without the nanolayer material 70/170. In this regard, the abradable seal 64 is better able to maintain its shape under aerodynamic forces and provide mechanical damping.

The abradable seal 64 can be fabricated by mechanically mixing the nanolayer material(s) 70/170 into the polymer of the polymer matrix 68, or a precursor thereto, such as uncured polymer. The resulting unformed material can then be molded or otherwise shaped into the desired geometry of the abradable seal 64. For example, the abradable seal 64 can be a fully prefabricated piece that is then installed in the fan case 15, or the abradable seal 64 can be formed in situ on the fan case 15, such as by deposition or injection molding.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A gas turbine engine comprising:
a plurality of circumferentially-spaced blades including a polymeric coating thereon; and
an abradable seal circumscribing the blades, the abradable seal including a polymeric matrix with a dispersion of a nanolayer material, wherein the nanolayer material includes at least one of sheet-structured graphene that has a bonded network of carbon atoms in a 2-dimensional geometry or MXene that has a formula of

$M_{n+1}X_n$, and wherein the nanolayer material includes the sheet-structured graphene and the MXene.

2. The gas turbine engine as recited in claim 1, wherein the polymeric matrix is silicone.

3. The gas turbine engine as recited in claim 2, wherein the sheet-structured graphene has an atomic monolayer structure.

4. A case for a gas turbine engine, comprising:
an annular support; and
an abradable seal mounted on a radially inner side of the annular support, the abradable seal including a polymeric matrix with a dispersion of a nanolayer material, wherein the nanolayer material includes at least one of sheet-structured graphene that has a bonded network of carbon atoms in a 2-dimensional geometry or MXene that has a formula of $M_{n+1}X_n$, and wherein the nanolayer material includes the sheet-structured graphene and the MXene.

5. A seal for a gas turbine engine, comprising
an annular abradable seal including a polymeric matrix with a dispersion of a nanolayer material, wherein the nanolayer material includes at least one of sheet-structured graphene that has a bonded network of carbon atoms in a 2-dimensional geometry or MXene that has a formula of $M_{n+1}X_n$, and wherein the nanolayer material includes the sheet-structured graphene and the MXene.

6. A composition comprising:
a polymeric matrix; and
a dispersion of a nanolayer material within the polymeric matrix, wherein the nanolayer material includes at least one of sheet-structured graphene that has a bonded network of carbon atoms in a 2-dimensional geometry or MXene that has a formula of $M_{n+1}X_n$, and wherein the nanolayer material includes the sheet-structured graphene and the MXene.

* * * * *